AUTOMATIC TELEPHONE EXCHANGE

Filed March 13, 1952 5 Sheets-Sheet 1

INVENTORS.
JAMES M. BLACKHALL
WILLIAM H. BLASHFIELD
DORSEY D. SIMMONS
MAURICE G. RYON
CLARENCE C. CROW
BY Brown, Jackson, Boettcher & Dienner
ATTYS.

AUTOMATIC TELEPHONE EXCHANGE

Filed March 13, 1952 5 Shéets-Sheet 2

INVENTORS.
JAMES M. BLACKHALL
WILLIAM H. BLASHFIELD
DORSEY D. SIMMONS
MAURICE G. RYON
CLARENCE C. CROW

BY Brown, Jackson, Boettcher & Dienner

ATTYS.

AUTOMATIC TELEPHONE EXCHANGE

Filed March 13, 1952 5 Sheets-Sheet 3

INVENTORS.
JAMES M. BLACKHALL
WILLIAM H. BLASHFIELD
DORSEY D. SIMMONS
MAURICE G. RYON
CLARENCE C. CROW
BY
Brown, Jackson, Boettcher & Dienner
ATTYS.

Oct. 16, 1956 J. M. BLACKHALL ET AL 2,767,250

AUTOMATIC TELEPHONE EXCHANGE

Filed March 13, 1952 5 Sheets-Sheet 4

INVENTORS.
JAMES M. BLACKHALL
WILLIAM H. BLASHFIELD
BY DORSEY D. SIMMONS
MAURICE G. RYON
CLARENCE C. CROW

Brown, Jackson, Boettcher & Dienner
ATTYS.

Oct. 16, 1956 J. M. BLACKHALL ET AL 2,767,250

AUTOMATIC TELEPHONE EXCHANGE

Filed March 13, 1952 5 Sheets-Sheet 5

INVENTORS.
JAMES M. BLACKHALL
WILLIAM H. BLASHFIELD
DORSEY D. SIMMONS
MAURICE G. RYON
CLARENCE C. CROW

BY Brown, Jackson, Boettcher & Dienner

ATTYS.

United States Patent Office 2,767,250

Patented Oct. 16, 1956

2,767,250

AUTOMATIC TELEPHONE EXCHANGE

James M. Blackhall, William H. Blashfield, Dorsey D. Simmons, Maurice G. Ryon, and Clarence C. Crow, Galion, Ohio, assignors to North Electric Company, a corporation of Ohio Application March 13, 1952, Serial No. 276,252

32 Claims. (Cl. 179—18)

The present invention relates in general to an automatic telephone system, and in particular to P. A. X telephone systems for serving a smaller number of subscribers.

The provision of a private automatic communication system is, in many instances, fundamental and essential to the accomplishment of efficient and dependable coordination of the operations of an organization, and as a result there has been a constantly increasing demand for telephone systems of the private automatic type. Small offices, firms, schools, warehouses, parking lots, hospitals and other institutions are only a few of the many organizations which have a need for reliable communication service of the P. A. X type.

Although there have been various types of small exchange equipment developed heretofore, the large number of component parts which was required in most of these exchanges was so great as to increase the cost of manufacture, the cost of installation and the cost of maintenance to a point where purchase thereof was frequently impractical. In other instances where the system was developed to include a minimum amount of component parts, a great sacrifice in operating features was experienced and the usefulness thereof was questionable.

It is a primary object of the present invention to provide a reliable and efficient telephone system which meets the interior communication problems of most smaller organizations, which is economical in its structure and which includes all the operating characteristics which are necessary to the provision of efficient, reliable, dependable communication service.

It is a specific object of the invention to provide an economical system capable of providing automatic, twenty-four hour, intra-plant communication without a switchboard and independent of the public telephone system. It is a further object of the invention to provide a system of this type which is practical for use in installations which service a comparatively small group of subscribers.

Other specific objects and features of the invention will become apparent from the following disclosure and description, one system embodying the basic structure of the telephone system of the invention being set forth in Figures 1 to 5 of the drawings in which.

*General equipment description*

Figure 1:
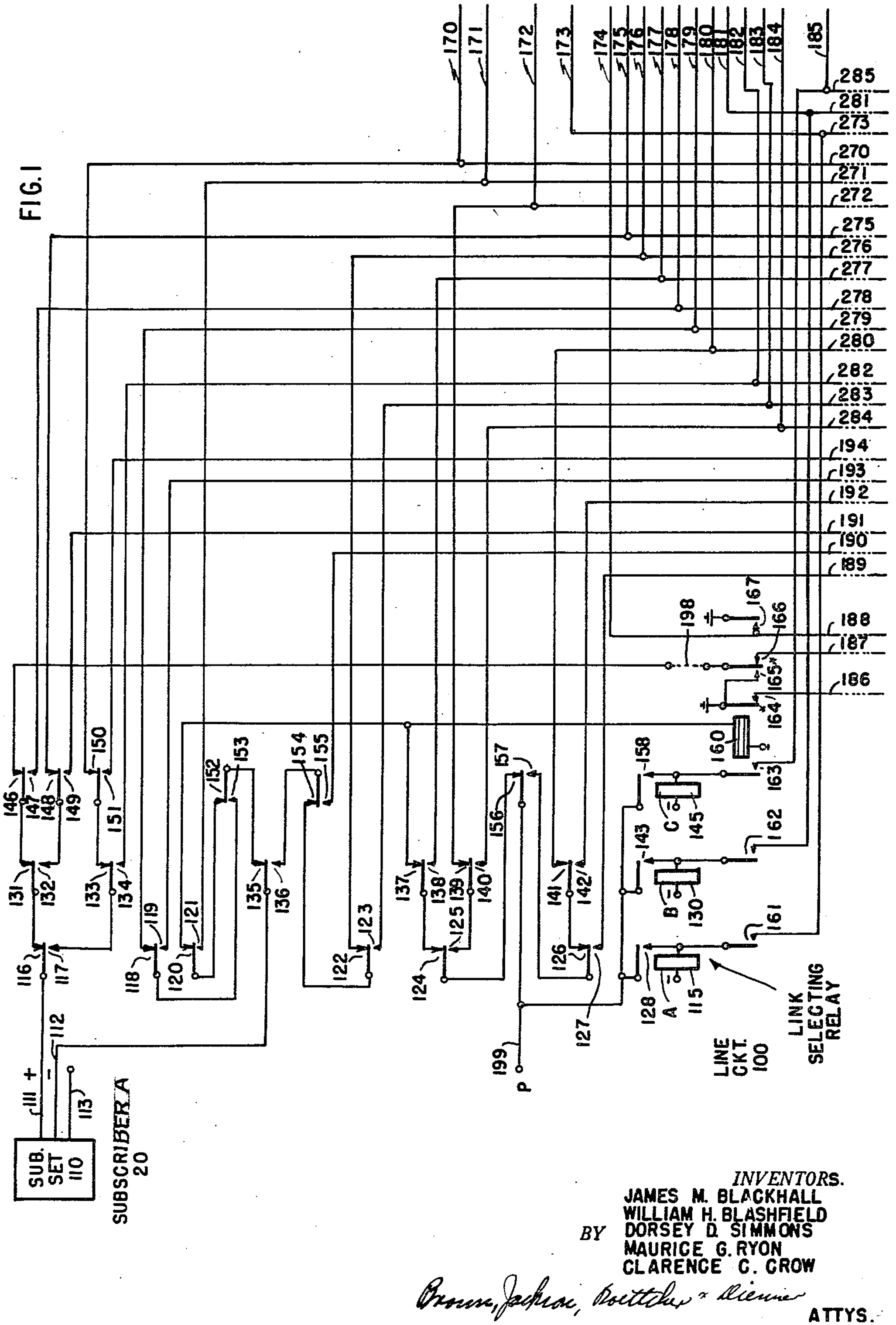
Figures 1 and 2 illustrate the line circuit equipment.

The novel automatic telephone system of the invention comprises a complete automatic switchboard operated by magnetic relays which is housed in a simple, compact, formed-steel cabinet for easy mounting on the floor, shelf, walls, ceiling, or under counters and other inconspicuous out-of-the-way places. The outer dimensions of the cabinet housing for an embodiment of the telephone system of the invention which is adapted to serve forty subscriber lines is approximately 10" x 20" x 40". Removable front and rear covers provide ready access to the automatic switching equipment which is mounted on a welded steel frame within the housing. The main distributing frame is eliminated by providing terminal members in the cabinet for connection of the subscriber substation equipment, such connection being accomplished by three line wires which extend between each substation and the cabinet. Any standard dial telephone substation may be used which includes a straight line ringer arranged for divided ringing, the third lead from the telephone being connected to the third or ringing wire. The switchboard equipment is arranged to operate with any standard type of dial. Close dial speed regulation is not essential.

The automatic switching equipment housed in the cabinet is basically comprised of sturdy, single motion relay members which because of their simple, single-motion characteristics eliminate the wear and deterioration experienced in the equipment which includes mechanical switches and the inherent plunging, rotating, step-by-step hammering and other complicated part-wearing motions of the conventional mechanical type switches. Further equipment located in the housing may include a vibrating-reed type ringing converter which is operated with seizure of the common control equipment by a calling subscriber. An electronic tube, oscillator-type busy and dial tone generator is housed in the cabinet and is operative to notify calling parties of dialing accessibility and busy line conditions. Charging equipment consists of a full wave, gaseous dual diode rectifier operating from 110 volt, 60 cycle current, the operation thereof being entirely automatic. A fuse panel accommodates six grasshopper fuses which protect each of the D. C. circuits in the arrangement, whereby with occurrence of a short circuit, a glance at the panel will reveal which of the circuits is in trouble. Those systems having conference call arrangements and code call arrangements will have additional circuits and further conventional type signalling devices for use therewith.

Installation of the equipment is extremely simple, the power connections being comprised solely of a plug, or terminal arrangement, for connecting the unit to a commercial 110 or 120 volt, 60 cycle, A. C. supply. Each subscriber substation is connected to the terminals appearing on the cabinet housing by means of three wires, which may be of twisted cable, if desired.

*General operation*

The establishment of a connection by one subscriber to another subscriber in the exchange is accomplished by the subscriber in the conventional manner; that is, the handset is lifted from the cradle of the calling party whereupon dialling tone is automatically extended by the equipment to his receiver and the dialling of the directory number of the desired subscriber may be undertaken. In the illustrated equipment two digit numbering is utilized, the numbers for the 40 line system being in the 20, 30, 40 and 50 series group. In this manner a safeguard against transmission of possible wrong numbers resulting from careless handling of the instrument, removal of the receiver, or due to swinging shorts on the line is provided against improper operation of the equipment. Further safeguards for providing protection against such type impulse are also included in the common equipment.

The switching relays respond to the dialled number by selecting the substation of the desired party and thereafter by applying ringing current to the substation associated therewith. In the interest of reducing the time period for which the common equipment is held, the substation is rung with only one ringing period in the illustrated embodiment.

In establishing conference calls, a preassigned conference number is dialled by the calling subscriber and the substations of each of the parties having this service are automatically rung. The illustrated system may be modified so that as many as six parties may be simultaneously signalled and connected for a given conference call, the figure illustrating the manner of connection of two parties for exemplary purposes.

In establishing code calls, a preassigned code call number is dialled whereupon the code call equipment is automatically seized by the switching equipment and connected for control by the dial of the calling subscriber. With the seizure of this equipment the subscriber thereafter dials the two digit code of the desired party which automatically codes a gong or suitable signalling device with the code number until the called party answers by dialing a second preassigned code number.

*General switching equipment description*

The switching equipment which is mounted in the housing basically comprises a plurality of line circuits, such as 100 and 200, one for each subscriber substation, such as 110, 210 etc., a plurality of link circuits 300, six in number in the illustrated system, common control equipment 400, and counting chain and selection relays 500.

The line circuit 100, for example, is comprised of a line relay 160 and three link selecting relays 115, 130 and 145 respectively. Line relay 160 in each line circuit is operated over the subscriber's loop responsive to initiation of a call in the conventional manner by the subscriber at the associated substation and is effective with operation to prepare seizure of an idle link and to open a guard circuit extending through the contacts of all the line relays in the system to thereby prevent simultaneous seizure of the dialling equipment by two or more substations. During this period of guarding which is effected as soon as any subscriber initiates a call, any other subscribers attempting to seize the equipment for establishing a connection are prevented from landing and must necessarily wait until the initiated connection is completed. At such time the lowest numbered station which is awaiting access to the common control equipment will be granted such privilege.

Included with the line relay such as 160 in each line circuit, such as 100, are three link selecting relays such as A (115), B (130) and C (145) which are individual (singly and in given combinations) to each of six links A (301), B (302), C (303), AB (304), AC (305) and BC (306) of the link equipment 300. Accordingly, when relay 115 operates it connects the line to link A; relay 130 to link B; relay 145 to link C; relays 115 and 130 to link AB; relays 115 and 145 to link AC; and relays 130 and 145 to link BC. The link selection relays A, B, and C are operative with the associated line relay, such as 160, in seizing an idle link with initiation of a call at their assigned subscriber substation, the selection of a link by a line being different than the existing arrangement in most conventional systems in which the links select the line. The line circuits are each connected to a common "start" lead which is extended by allotter equipment to the idle lines.

Each of the six links comprises a control relay 310, an allotter relay 315 and a start relay 320. If the link is available, the allotter relay 315 is in the operated condition and is arranged at its contacts to connect the common start lead from the subscriber line circuit to the start relay 320 of its link as its turn occurs, and is also arranged at that time to disconnect the start lead from the succeeding links in the chain to prevent seizure thereof by any of the subscribers while the present connection is being effected. If a link is in use and the common equipment has been dismissed, the associated allotter relay 315 will be released, and the start lead from the subscriber line circuits will be extended to the next link of the group. When all of the allotter relays are released, a reset relay 330 operates with receipt of a succeeding call to prepare the links of the group which are idle for further use. When no links are available, the calling party must wait until a link is released.

The start relay 320 of the links controls operation of a link selection relay individual to its link (or a combination of link selection relays individual thereto). Briefly, as a subscriber initiates a call by removing his receiver in the conventional manner, the line relay, such as 160, in the associated line circuit, such as 100, operates to guard against the other subscriber substations from initiating a call for a temporary period, and simultaneously energizes the start lead which is extended to an idle one of the links by the allotter relays in the link equipment. If link A is idle and has been reset, allotter relay 315 is in the operated condition, and the energization of the start lead will operate the start relay 320 thereof. Link selection relay such as A (115) of each line circuit, such as 100, is individual to link A (301), and accordingly as start relay 320 of link A operates, it prepares an energizing circuit for the link selection relay A (115). In a similar manner, link selection relay 130 is individual to B (302) in each of the line circuits; link selection relay C (145) is individual to link C (303); link selection relays A and B are individual to link AB (304); link selection relays A and C (115 and 145) are individual to link AC and link selection relays B and C (130 and 145) are individual to link BC.

As will become apparent hereinafter, the link selection relay, which is operated as its individual link is seized, connects the positive and negative wires of the calling line to the seized link to provide a dialling loop between the calling substation and link equipment. An arrangement in which a number of link selection relays less in number than the links in the system are utilized singly and in combination to route the subscriber lines over the links, provides a system in which a minimum amount of equipment is required to effect dependable and reliable circuit connecting operations. Further, the arrangement is such that simultaneous seizure of the equipment by more than one subscriber at any given time is prevented in a reliable and efficient manner. Finally the method of allotting the links when utilized in combination with the novel "line selecting the links arrangemet" (rather than links selecting the line) provides an economical arrangement which eliminates a substantial amount of unnecessary equipment.

As the calling subscriber line is extended through to the link equipment, the link control relay 310 is operated to seize the common control equipment 400, which responds by conditioning an associated timer for determining the permissible time during which the subscriber may initiate dialling, transmits dialling tone to the subscriber, starts the ringing vibrator equipment, opens the landing-in operating paths for the line relays to continue the temporary guarding action as to the subscribers other than the party initiating the call, and prepares to receive the incoming impulses from the subscriber dial for retransmission to the counting chain.

The common control equipment which is operative with seizure by the link includes the timing relay 410, the pulsing relay 415, hold relay 420, busy-idle relay 450. Upon receipt of the first impulse of each digit, dialling off-normal relay 430 and its slave 460, are energized and remain energized until shortly after the end of the digit. Relay 420 energizes the ringing vibrator coil 495.

As the subscriber now dials the number of the party with which connection is desired to be made, the impulses are transmitted from the dial of the substation to link relay 310 and thence to pulsing relay 415 of the common control equipment, the circuit of these relays being opened and closed a number of times corresponding to the value of the digit which is dialled. The incoming impulses are repeated to a five relay counting chain 500, which counts the dial pulses and effects operation of the group selection relay corresponding with the value of the digit counted. If a preliminary impulse is received and recorded on the counting chain, a wrong number would be obtained, it being apparent that the counting chain would step one pulse higher than it should when the tens digit is dialled. The counting chain is therefore arranged to reset on initial digit 1.

As the value of the incoming digit is determined, the corresponding group selection relay which has been operated is locked up, dial tone is removed and the counting chain is restored to prepare same for reuse in the counting of the units digit of the called number. Thus at this time the particular tens group of the desired subscriber has been recorded in the common control equipment.

As the units digit is now received the pulsing relays 310 and 415 operate to advance the counting chain in accordance with the value of the digit received, and with the complete receipt of the units digit, the energization of the ringing transformer is effected, the dial tone circuit is opened and ground is connected to the P-wire of the line circuit such as 200 of the called party.

If the called party substation is in use one of the line selection relays, such as A (215), B (230) or C (245) or a combination thereof will be operated and accordingly the line relay, such as 260, of the called line cannot operate. With failure of the line relay of the called line to operate, the busy-idle relay 450 of the common control equipment will not release following dialling of the units digit, and busy tone is applied to the calling subscriber line.

In the event that the called line is not busy, the line relay will operate to prepare the operating path for the link selection relays A, B and C singly or in combination by the effective one of the links. That is, in the event that the call is being initiated over link A, the ground on the start lead extending between link A and the line circuit of the called subscriber will effect operation of the associated link selection relay 215 therein. The link selection relay 215 operates and effects connection of the subscriber substation 210 to the link and to the calling subscriber.

Thereafter ringing current is applied to the ring conductor of the called party station. As pointed out, four wires for each line are required within the switchboard and are designated as the positive, negative, ring and test wire conductors. With the operation of the group selection relay, the test and ring conductors of the called party are seized for use by the common control. In the present arrangement, the use of a single ringing period prevents undue tie-up of the common control equipment by a calling subscriber, and provides an arrangement in which calls are completed more quickly and in a more reliable manner. The splitting of the third wire so that the R and P leads are isolated provides an arrangement in which fewer contacts are required on the link selection relays, such as 115, 130 and 145, and again provides a more favorable operating arrangement.

The aforegoing method in which a line is assumed to be busy unless proven otherwise also insures a more rapid operating telephone system arrangement.

As is apparent from the foregoing disclosure, the links in the present arrangement are single ended. That is, a conventional switchboard has two ends to its links in order to (*a*) separate the calling and called lines for ringing; and (*b*) to separate the talking battery feed to the calling and called lines.

In the present arrangement where the lines are short, separation of battery feed is unnecessary and two lines are connected directly together and fed from the one link relay, such arrangement having been made feasible by the use of a third ringing wire per telephone, whereby it is possible to ring even though the talking currents of the calling and called phones are directly connected in the link. Such arrangement materially reduces the selection equipment required in the links, for if conventional double ended links were used, the link selection relays in each line would have to choose not only the link, but also the desired end of the link. In such event, the number of links that could be reached by a given number of selection relays would be halved.

Other advantages and features of the arrangement will become apparent from the following specific description of the equipment as it operates in the establishment of a call between two subscribers of the exchange.

*Specific circuit operation*

The equipment in operation is effective to connect the calling party automatically to the dial equipment, return dialling tone to the calling party, record the dial impulses, test for busy lines, select the party in accordance with the dial impulses recorded, ring the desired party, and to complete the talking connection. The equipment is also operative to provide conference calls to six lines, automatic timed release of the common control equipment, and code calls to given parties. These operations are now set forth hereat in a more specific manner.

*Line circuit seizure*

In the extension of a call between two subscribers of the telephone system, as for example, in the extension of a call between subscribers A and B in the illustrated system, the calling subscriber A lifts his receiver at his associated substation and dials the directory number of the desired party B, which will be a two-digit number comprised of a tens and a units digit. As shown in the drawings, directory number 26 has been assigned to subscriber B.

With removal of the receiver from the substation 110, the associated line relay in the associated line circuit equipment 100 is activated to select a preallotted idle one of the links 300. The link seizes the common control equipment 400, and the link selection relays then effect cut-through of the calling line to the seized link at this time. Common control equipment 400 returns dial tone to the receiver of the calling subscriber A, and immediately initiates a timing period of a given value during which the subscriber must transmit the first digit of the called number or lose his connection with the common control equipment 400.

With receipt of the dialling pulses, a counting chain arrangement 500 in the common control is operated to control the group selection relays C20—C50 to select the test lead of the called line 26, and if idle, to effect operation of the line circuit 200 associated with the called line; and to effect connection of the called line to the seized link and the calling line. Ringing current is then applied to the called line, after which the common control 400 automatically restores. Communication may be effected with answer of the called party over a path which extends over the seized link and the operated line circuits. The detailed operation of the equipment is set forth in the following description in which it is assumed that subscriber A at substation 110 operates his dial to extend a talking connection to substation 210 and subscriber B.

As subscriber A removes his receiver from the switch hook of substation 110, an operating circuit is extended to line relay 160 of the line circuit 100 associated with substation 110 of subscriber A, the circuit extending from ground over a series circuit which passes over the contacts such as 164 and 264 of each line relay 160, 260 etc. in the system whereby simultaneous seizure of the dialling equipment by two stations is prevented and a guard circuit is provided which prevents another subscriber from interfering with a call which is underway. The operating circuit for line relay 160 specifically extends from battery over the winding of line relay 160, contacts 120, 152, 135, negative conductor 112, the contacts in the substation 110 which are closed as a result of the receiver of the subscriber being lifted from the handset, positive conductor 111, contacts 116, 131, 146, 166, conductor 187, contacts 463, 424, conductor 329, contacts 264 and the other similar contacts on the other line relays in the system and contacts 164 to ground. It is apparent that once a line relay such as 160 is operated by a subscriber initiating a call, the opened contacts, such as 164, prevent any other line relay from becoming effective. Stations which attempt calls and wait for release of the common equipment will be afforded access thereto in accordance with the value of their directory number, the lower numbered station of the waiting group being given preference.

Line relay 160 operates, and at its contacts 161, 162 and 163 prepares operating circuits respectively for the link selection relays 115, 130 and 145; and at its contacts 164 and 166 interrupts a point in the chain of guard contacts, which extends through all the line relays of each of the subscribers in the exchange, so that simultaneous calls by several subscribers are prevented. Line relay 160, at its contacts 165, completes a self-holding circuit, which extends from battery over the winding of relay 160, contacts 120, 152, 135, negative conductor 112, the contacts of substation 110 which are closed as a result of the receiver being removed from the set, positive conductor 111, and contacts 116, 131, 146 and 165, to ground, the holding circuit completing contacts 165 being of the make-before-break type so as not to interrupt the initial energizing circuit for relay 160. Line relay 160, at its contacts 167, applies ground to the start conductor 174 which extends to an idle preallotted link of the group, or if all links are busy, to reset relay 330.

As was previously noted, an allotter relay 315 in each of the links 301 to 306 inclusive, is in the operated condition in each available link, the operating circuit therefor extending from battery over the winding of relay 315, and contacts 316 and 311 to ground.

If link A is idle, its associated allotter relay 315 will be in the operated condition, and as the line relay 160 in the link circuit of the calling subscriber is operated, start relay 320 of preallotted idle link A will be energized thereby, the energizing circuit extending from battery over the winding of relay 320, contacts 317, start conductor 174 and contacts 167 to ground. Seizure of link A is thus effected.

If link A were not idle, allotter relay 315 associated therewith would be in the deenergized condition, contacts 318 thereon will be closed, and the start lead would have been extended over closed contacts 318 to the next link of the series, that is, link B (302). If link B is also in use, its allotter relay 315 would have its contacts 318 closed and the start lead 174 would be extended to the succeeding link C of the series.

As the calls are initiated each of the six links are used in turn. If all allotter relays such as 315 are released as a further call is initiated by one of the subscribers, the ground applied by the contacts 167 of the line relay 160 of the calling subscribers is extended by the start conductor 174 over contacts 318 of each of the six links 301 to 306 to the reset relay 330, which is responsively energized thereby in an obvious manner.

Relay 330 operates, and at its contacts 331 to 336, inclusive, completes reset circuits for the allotter relays 315 of each of the links which are now idle. Assuming the call that was previously established over link B is completed, and the connection between the calling and called parties released, allotter relay 315 thereat would still be in the deenergized condition. As reset relay 330 operates, it is effective at its contacts 332 to complete an operating circuit for the allotter relay 315 (and all other allotter relays associated with idle links at this time) which extends from battery over the allotter relay 315, contacts 332 and contacts 311 to ground.

Those links which are still in use will have their control relay 310 in the operated condition, and accordingly the operating circuit completed by reset relay 330 for the allotter relay 315 will be interrupted at contacts 311, and the associated link will be unaffected by the operation of the reset relay 330.

In the event that all links are busy there will be no dial tone, the subscribers being advised by the absence of dial tone that a call cannot be completed at this time. As will be shown hereinafter, if a call is attempted while the control is being used by another subscriber to establish a call, dial tone will not be provided and again the subscriber is advised by such absence that a call cannot be made at the time. A subscriber may wait on the line and as a link is released, his call will be routed. Since his line relay is operated, the routing of a call by a party having a lower number after this time will not be given priority.

*Link seizure*

As the start relay 320 of an idle link (in the exemplary description link A) is operated as the result of extension of ground thereto over the start lead 174 by the line relay 160 of the line circuit 100 associated with the substation of the calling subscriber, it is effective at its contacts 321 to prepare a series holding circuit for link allotter relay 315 and pulsing relay 415 of the common control equipment 400; at its contacts 322 completes an operating circuit for link control relay 310; at its contacts 323 prepares extension of the P-wire 172 of the calling line to the common control equipment, whereby a holding circuit effective during dialling is prepared for the link selection relay; at its contacts 324 extends the select conductor 173 to the common control equipment to prepare the link selection relay associated with the seized link for operation; and at its contacts 325 prepares a self-holding circuit extending to the common control equipment 400.

Link control relay 310 operates over the circuit completed by the operated start relay 320, the circuit extending from battery over the lower winding of relay 310, contacts 322, C309, contacts 441 and 453 to ground, and at its contacts 311 interrupts the initial operating circuit for allotter relay 315, and at its make-before-break contacts 312 shifts the allotter relay 315 to the control of the common control equipment 400 to complete a series energizing circuit for the pulsing relay 415 in the common control equipment 400, the circuit extending from battery over the winding of relay 315, contacts 316, make-before-break contacts 312, contacts 321, conductor 327 and the winding of pulsing relay 415 to ground. Link control relay 310 at its contacts 313 grounds P-wire of the calling line to prepare a holding circuit effective during talking for the operated one of the link selection relays.

*Seizure of common control equipment*

Pulsing relay 415 in the common control equipment 400 operates in series with the link control relay 310, and at its contacts 418 completes an operating circuit for the slow-to-release hold relay 420, which extends from battery over the winding of relay 420, contacts 418 and 412 to ground.

Hold relay 420 operates, and at its contacts 421 connects ground to conductor 307 and the select conductor which has been extended thereto by the start relay 320 of the operated link (in the illustrated case select lead 113 has been extended by link A), whereupon an operating circuit is completed for the link selection relay which is associated with the seized link (link selection relay 115 for link A); at its contacts 422 interrupts the operating circuit for normally energized timing relay 410; at its contacts 423 completes a holding circuit for start relay 320; at its contacts 425 prepares an operating circuit for the busy-idle relay 450; at its contacts 426 prepares an operating circuit for the associate dialling off-normal relay 430, and at its contacts 423 completes an operating circuit to the ringing vibrator 495 to initiate operation thereof. The holding circuit for start relay 330 extends from battery over the winding of relay 320, contacts 325, conductor 326, contacts 411 and 423 to ground.

Link selection relay 115 in line circuit 100 now operates over the circuit extending from battery over the winding of link selection relay 115, contacts 161, select conductor 173, contacts 324, conductor 307, contacts 451 and 421 to ground.

As was previously set forth, the link selection relay (or relays) to be operated at this time is determined by the particular line relay which is now operated (line relay 160 in the present disclosure), and by the operated one of the start relays in the links (start relay 320 in link A in this example). Thus if link B had been seized, start relay 320 of link B would be operated, and the select lead 181 would be connected to select lead 307 of the common control equipment to effect operation of link selection relay B (130). For link C, select lead 185 is grounded to operate link selection relay 145; for link AB, select leads 286 and 287 are grounded to operate link selection relays A (115) and B (130) in combination; for link AC, select leads 288 and 289 are grounded to operate link selection relays A (115) and C (145); and for link BC select leads 294 and 295 are grounded to operate link selection relays B (130) and C (145).

As the effective link selection relay operates (relay 115 for link A), it is effective at its contacts 116 and 120 to interrupt the energizing circuit for the operated line relay 160, at its contacts 117 and 121 extends the positive and negative conductors 111 and 112 of the subscriber substation 110 to the seized link 301, and at its contacts 128 completes a self-holding circuit, which extends from battery over the winding of relay 115, contacts 128, 156, 125, 139 to the P-wire 172 and holding ground which has been placed thereon by the operated control relay 310.

It is apparent that the link selection relay or relays operated effect connection of the calling line associated therewith to the seized one of the links, and then lock-up to hold the connection.

Line relay 160 restores, and at its contacts 164 recompletes guard circuit which extends through the line relays of the link selection equipment for each subscriber. The guard chain, however, is maintained opened for a further period by the open contacts 424 of the operated hold relay 420 in the common control equipment.

With the restoration of the line relay 160 and the reclosure of contacts 164 to re-apply ground to the guard chain, an operating circuit is completed for the busy-idle relay 450, the circuit extending from battery over the winding of relay 450, contacts 443, 425, conductor 329, contacts 264 and each of the like contacts on the line relays for each substation in the system to contacts 164 and ground. Line relay 160, at its contacts 161 interrupts the original energizing circuit for link selection relay 115 which remains held over the described holding circuit.

Busy idle relay 450 operates, and at its contacts 451 opens a point in the circuit applying the original energizing ground to the effective link selection relay (or relays), at its contacts 452 transfers same to an auxiliary holding path which is effective during dialling and pulsing of link control relay 310 at its contacts 453 interrupts the original operating path of link control relay 310, which is thereafter controlled over the line loop extending from the substation 110 of subscriber A; and at its contacts 454 completes a self-holding circuit to the exclusion of the contacts 443 of control circuit relay 440.

Dial tone equipment 480 is normally energized. Dial tone is applied to the calling substation from ground through the dial tone circuit 480, 9000 ohm resistor 493, contacts 458, 436, 457, 441, conductor 309, contacts 322, negative conductor 171, contacts 121, 152, 135, negative conductor 112, through the receiver of substation set 110 of subscriber A, positive conductor 111, contacts 117, 133, 150, positive conductor 170, and the upper winding of relay 310, to ground.

Timing relay 410, which had its operating circuit interrupted with the operation of hold relay 420, remains in the operated position for a period of about 10 seconds thereafter by reason of the capacitor 413 which is connected in shunt thereof. This time out period provides a reasonable period of delay during which initiation of impulse transmission may be effected by the subscriber, while at the same time providing means for preventing the subscriber from tieing up the common control equipment to the exclusion of others for an unreasonable period of time.

If the calling subscriber fails to dial within approximately ten seconds, capacitor 413 discharges to a value sufficiently low to release timing relay 410. As relay 410 releases, it is effective at its contacts 411 to interrupt the energizing circuit for the start relay 320 and at its contacts 418 opens the circuit of slow-to-release hold relay 420. Start relay 320 releases and at its contacts 321 interrupts the energizing circuit for the allotter relay 315.

When hold relay 420 releases, idle-busy relay 450 is released at contacts 425, and timing relay 410 is reoperated at contacts 422. Contacts 424 close the series circuit of all line relays, thereby permitting another line to seize the common control equipment, provided there is an available link.

If the first digit has been dialled, the operation of relay 430 has reenergized timing relay 410 and capacitor 413. After the release of relay 430 (if further dialling does not take place within approximately ten seconds), relay 410 releases in turn releasing relay 420, which in turn reenergizes relay 410 and releases relays 450, 440 and the group selection relay.

Assuming extension of the call in the normal manner, the call will have landed in the link equipment 300 and the seizure of the common control equipment 400 will now have been completed. At this time link selection relay 115 of line circuit 100, link relays 310, 315 and 320 of the seized link A and control relays 410, 415, 420 and 450 are in the energized condition.

*Dialling of called party number*

The dialling loop for the impulse repeating relay 310 in the link equipment 300 is repeatedly completed and interrupted with the operation of the dial of the subscriber in the conventional manner, relay 310 being energized with each completion of the loop and restored with each interruption of the loop by the dial contacts at the substation of the calling party.

Line relay 415 in the control equipment 400 follows the operation of link control relay 310 by reason of the interruption and completion of the energizing circuit therefor by contacts 312 of the link control relay 310. Link allotter relay 315 is alternately held in series with the common control line relay 415 (if contacts 312 of repeater relay 310 are closed) or by direct ground applied over contacts 311 of repeater relay 310.

With receipt of the break period of the first incoming impulse, common control line relay 415 releases to close contacts 419 and complete an operating circuit for the secondary hold relay 430, the circuit extending from battery over winding of relay 430, contacts 476, 426, 419, 412 to ground. The operating circuit for the first hold relay 420 is interrupted at contacts 418, but inasmuch as this relay is slow-to-release it restores only with receipt of the pause between successive digits.

Hold relay 430 operates and at its contacts 431*a* recompletes the energizing circuit for capacitor 413 to maintain the timer relay 410 operated; at its contacts 431 completes an obvious operating circuit for hold relay 460 in the common control equipment; and at its contacts 432 maintains open during each train of dial impulses, the operating paths which extend over the counting chain to the group selection relays and relay 470. Relay 460 operates and at its contacts 462 prepares the operating circuit for the first counting chain relay 510, and the holding circuit for relays 520 to 550, and at its contacts 463 opens a further point in the series circuit for the line relays such as 160 to prevent a waiting subscriber from "landing in" immediately in the event that the dial pulses are irregular enough to permit the release of hold relay 420.

With receipt of the first make after the first break, line relay 415 is reoperated to complete an operating circuit for the first counting chain relay 510, the circuit extending from battery over the winding of relay 510, conductor 434, contacts 472, conductor 439, contacts 524, 534, 543, 552, conductor 433, contacts 462, 417 and 423 to ground.

Counting chain relay 510 operates, and at its contacts prepares an energizing circuit for the second counting chain relay 520, at its contacts 513 completes a self-holding circuit independent of contacts of relay 470, and at its contacts 514 prepares relay 470 for operation.

With receipt of the second break period, and the consequent restoration of the common control line relay 415, the associated contacts 416 are closed to complete a series energizing circuit for the first counting chain relay 510 and the second counting chain relay 520, the circuit extending from battery over the winding of relay 510, upper winding of relay 520, contacts 512, conductor 429, contacts 416 and 423 to ground.

Second counting chain relay 520 operates and at its contacts 522 prepares the operating circuit for the third counting chain relay 530 and at its contacts 524 interrupts the holding circuit for the first counting chain relay 510 to effect the restoration thereof.

Inasmuch as the directory number of subscriber B has been assumed to be 26, only two impulses are transmitted to the common control equipment by calling subscriber A at this time. Line relay 415 reoperates and a predetermined period after receipt of the second impulse the slow-to-release relay 430 will restore, the circuit thereof being interrupted at contacts 419 of the operated pulsing relay 415.

With the restoration of relay 430, associated contacts 431 interrupt the holding circuit for the common control relay 460 and contacts 432 complete an operating circuit for the group selection relay C20, the circuit extending from battery over the winding of relay C20, contacts 525, conductor 448, contacts 445 and 432 to ground. It is apparent that if the third counting chain relay were operated at this time, an operating circuit would now be completed for group selection relay C30, etc.

Relay 430 is also effective at its contacts 431 to interrupt the energizing circuit for the timer relay 410 which commences another timing period of ten seconds. It is seen therefrom that a time out period is initiated with the termination of receipt of each digit transmitted by the calling party and a further check against equipment tieup is provided.

Group selection relay C20 operates, and at its contacts 600*a*—619*a* selects the test and ring conductors of subscriber lines 20—29, and at its contacts 620*a* completes a self-holding circuit and prepares an operating circuit for relay 440. As relay 460 restores, it is effective at its contacts 462 to interrupt the holding circuit for the second counting chain relay 520 (which is the operated counting chain relay at this time) to effect the restoration therefore. As relay 520 restores it is effective at its contacts 525 to interrupt the energizing circuit for the group selection relay C20, which is now held energized over a self-holding circuit extending over contacts 620*a*, conductor 428, winding of relay 440, conductor 427, contacts 421 to ground. Common control relay 440 now operates, and at its contacts 444 prepares an operating circuit for relay 470, at its contacts 441 removes dial tone from the line, and at its contacts 446 prepares the sequence relay 570 for operation. The equipment now awaits receipt of the second digit from the dial of the calling subscriber A. It should be observed that relay 440 was shunted until release of counting relay 520.

If a preliminary impulse is received by a spurious means, the equipment functions to cancel the impulse. Briefly, as the line loop opens, the relay 310 releases 415, which in turn operates relay 430 and relay 460 as described before. When the line loop is reclosed, relay 310 reoperates in turn reoperating 415 which operates counting chain relay 510. The subsequent release of relay 430 releases slow-to-release relay 460, which in turn releases relay 510 resetting the counting chain. Relay 440 in operating is effective at its contacts 442 to complete a holding circuit for relay 510 if digit "1" or "6" is the digit dialed as the second digit.

It having been assumed that the directory number of the called party B is 26, the second digit 6 is now transmitted by the calling party A and is extended by the dial contacts at the subscriber substation set 110 over the loop conductors 170 and 171 to the link control relay 310, which is operative as before to repeat the impulses to the common control line relay 415. With the operation of pulsing relay 415, relays 430 and 460 are reoperated to connect the counting chain 500 to the pulsing relay 415 for advancement thereby to a point commensurate with the number of impulses in the incoming digit.

Briefly, with receipt of the first break impulse of the second digit, relay 415 restores and at its contacts 419 recompletes the energizing circuit for relay 430. Relay 430 operates, and at its contacts 431*a* recompletes an energizing circuit for the time out relay 410 to prevent same from effecting restoration of the common control equipment, and at its contacts 431 recompletes an operating circuit for the common control relay 460.

Relay 460 operates, and at its contacts 462 prepares the energizing circuit for the counting chain whereby advancement thereof is effected as the pulsing relay 415 responds to impulses received from the dial of the substation of the calling party.

The chain advances as heretofore described. That is, with the first operation of the line relay 415 following the first release, the pulsing relay 415 is effective at its contacts 417 to complete an operating circuit for the first counting chain relay 510 over the circuit heretofore described. With receipt of the second break impulse of the series and the release of pulsing relay 415, contacts 416 are closed and a series operating circuit is completed for the first and second relays of the counting chain, 510 and 520 respectively.

With the occurrence of the make period after the second break period, pulsing relay 415 operates and at its contacts 416 interrupts the series holding circuit for the first and second counting chain relays 510 and 520, and at its contacts 417 completes the holding circuit for the second counting chain relay 520 as heretofore described.

With receipt of the third break period and the release of the pulsing relay 415, contacts 416 are closed to complete the series operating circuit for the second and third counting chain relays 520 and 530, the circuit extending over the lower winding of relay 520, the upper winding of relay 530, contacts 522, 511, conductor 429, contacts 459, 416 and 423 to ground.

With receipt of the make period following the third break period, line relay 415 is operated and contacts 416 are opened to interrupt the series holding circuit for the second and third counting chain relays 520 and 530, and contacts 417 are closed to complete the holding circuit for the third counting chain relay 530, which circuit extends from battery over the lower winding of relay 530, contacts 533, 543, 552, conductor 433, contacts 462, 417 and 423 to ground.

With receipt of the fourth break period and the release of line relay 415, contacts 416 are closed to complete a series operating circuit for the third and fourth counting chain relays 530 and 540, the circuit extending from battery over the lower winding of relay 530, the upper winding of relay 540, contacts 532, 521, 511, conductor 429, contacts 459, 416 and 423 to ground.

As the make period following the fourth break period is received pulsing relay 415 operates, and at its contacts 416 interrupts the series holding circuit for the third and fourth counting chain relays 530 and 540, and at its make before break contacts 417 completes a holding circuit for the fourth counting chain relay 540, the circuit extending from battery over the lower winding of relay 540, contacts 542, 552, conductor 433, contacts 462, 417 and 423 to ground.

With receipt of the make period following the fourth break period pulsing relay 415 operates and at its contacts 416 interrupts the holding circuit for the fourth and fifth counting chain relays 540 and 550, and at its make before break contacts 417 completes a holding circuit for the fifth counting chain relay 550 the circuit extending from battery over the lower winding of relay 550, contacts 551, conductor 433, contacts 462, 417 and 423 to ground.

Simultaneously an energizing circuit is completed for the sequence relay 570, the circuit extending from battery over the winding of relay 570, contacts 561, 446, 551, conductor 433, contacts 462, 417 and 423 to ground. Sequence relay 570 operates and at its contacts 571 prepares a series operating circuit for sequence relay 560, which is shunted at this time and at its contacts 572—577 transfers the seizing circuits from lines 1, 2 and 4 of a group to lines 6, 7 and 9.

With receipt of the fifth break period, line relay 415 restores and at its contacts 417 interrupts the shunt circuit for the sequence relay 570 to permit the operation of sequence relays 560 and 570 in series over the circuit extending from ground over contacts 421 and conductor 427. The fifth counting chain relay 550 restores.

Sequence relay 560 operates, and at its contacts 561 opens the initial energizing circuit for sequence relay 570, at its contacts 562, 563, 564 and 565 transfers the seizing circuits from lines 3 and 5 to 8 and 0, and at its contacts 566 and 567 transfers the ringing lead from lines assigned the units digit 1–5 to lines assigned the units digit 6–0.

With the sixth operation of the line relay 415 responsive to receipt of the final impulse, contacts 417 are closed and an operating circuit is completed for the first counting chain relay as before, the circuit extending from battery over the winding of relay 510, conductor 434, contacts 472, conductor 439, contacts 524, 534, 543, 552, conductor 433, contacts 462, contacts 417 and 423 to ground.

After the expiration of a given period of time following receipt of the sixth and last impulse of the second digit of the called number, relay 430 will release by reason of the continued interruption of its energizing circuit at open contacts 419 on the energized pulsing relay 415. Relay 430 restores, and at its contacts 432 completes an operating circuit for the control relay 470 which extends from battery over the winding of relay 470, contacts 464, 444 (of the relay 440 now held operated in series with connector relay C20) and contacts 432 to ground.

Relay 430 is also effective at its contacts **431*a* interrupt the holding circuit for the timing relay 410 to initiate a time out period as determined by the characteristics of the shunting capacitor 413, and at its contacts 431 interrupts the holding circuit for relay 460, which is slow to release, and accordingly permits the extension of a ground impulse provided by relay 430 to be extended to relay 470** prior to its restoration.

As relay 470 operates, it is effective at its contacts 471 to connect additional resistance in the discharge circuit for capacitor 413, at its contacts 472 interrupts a point in the initial energizing circuit for the counting chain equipment 500, at its contacts 473 establishes a self-holding circuit extending from battery over the winding of relay 470, contacts 473, 444, 432 to ground; at its contacts 474 and 475 extends ground to the contacts of the counting chain for use in seizure of the particular subscriber line of the seized group which is being called at this time, and at its contacts 476 interrupts the operating circuit of secondary holding relay 430, thus preventing the dialing of an additional digit from reoperating 430 and in turn releasing 470.

Figure 5:
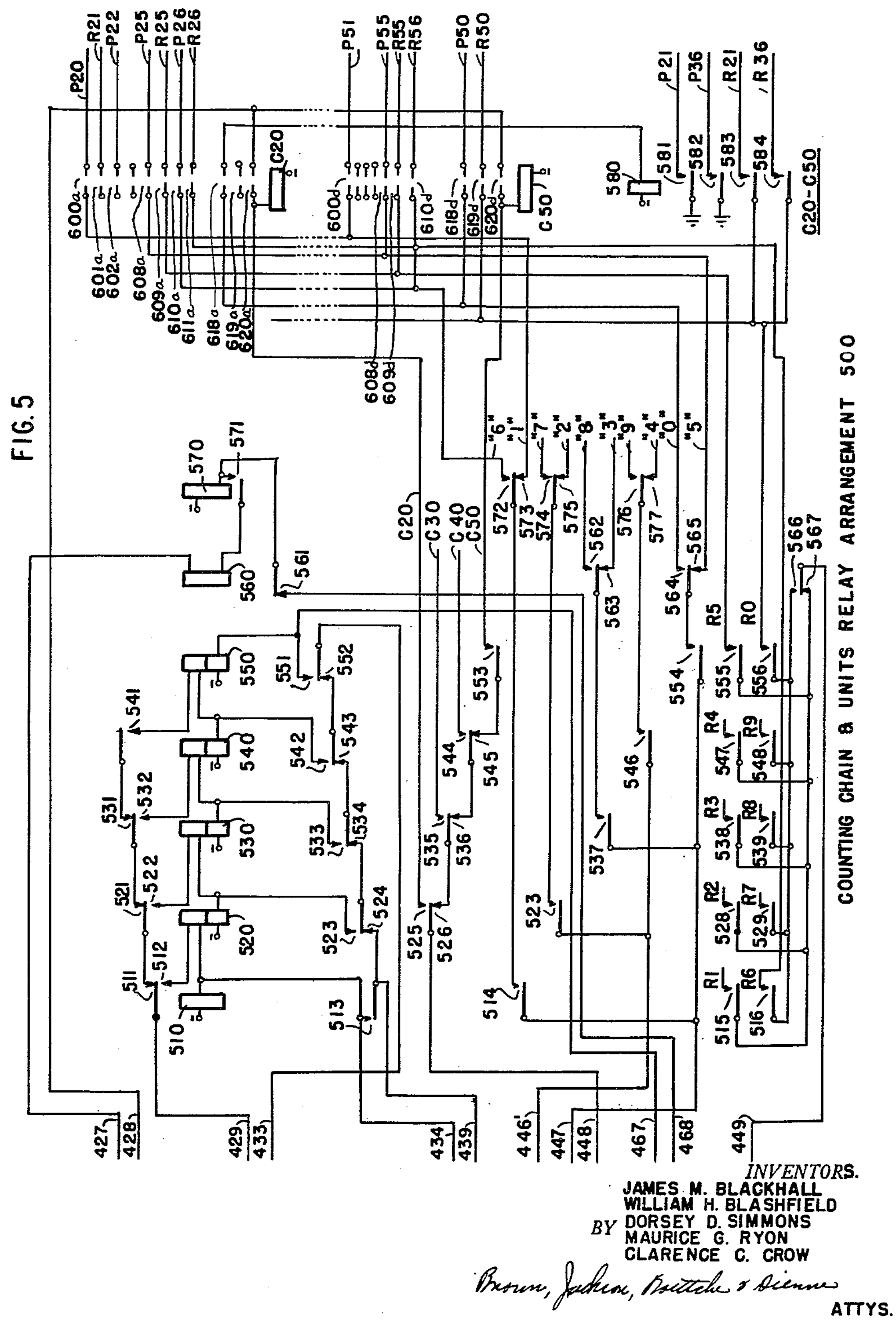
Figure 5 illustrates the counting chain and group selection relay equipment of the common control.

With reference to Figure 5 and the contacts on the counting chain relay 510 to 570 inclusive it is apparent that the first contacts 525, 526, etc. are arranged for operation in various groups and combinations to first select various ones of the group selector relays C20—C50 to determine the particular group of subscriber lines which is to be rendered effective, and the further group of contacts 514, 527, etc. and 572 to 577 determine the particular line of a seized group which is to be selected, this selection being effected by the extension of ground through the contacts of the counting chain relay which is operated at this time, the ground being supplied over conductors 446 and 447 by the now operated relay 470.

Inasmuch as the number of the called subscriber in the present example is 26, the selector relay C20 was seized responsive to receipt of the first two incoming impulses. At this time the first counting chain relay 510 and sequence relays 560 and 570 are operated to indicate that numeral 6 is registered on the counting chain 500. With operation of switch-through relay 470, an operating circuit is therefore completed for the sixth line of the group of lines associated with selector relay C20 i. e. line 26, the seizure circuit extending from ground over contacts 432, 444, 473, 475, conductor 447, contacts 514, 572, contacts **610*a* and the P-wire P26** of the subscriber having the called number 26.

Relay 460 restores, and at its contacts 464 interrupts a point in the line selecting circuit, the circuit being maintained however over the closed contacts 473 of the operated relay 470.

Figure 2:
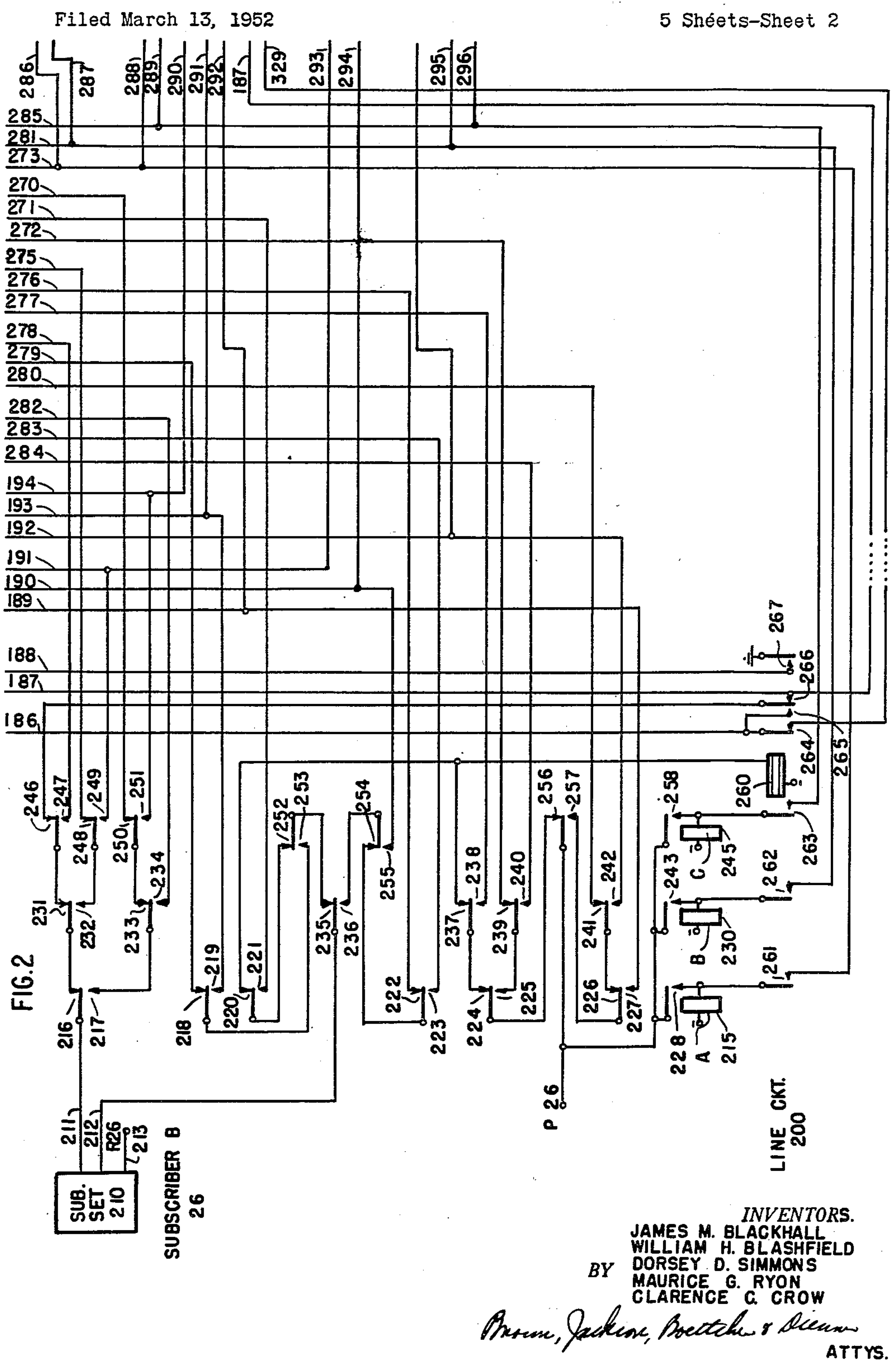
Figure 3:
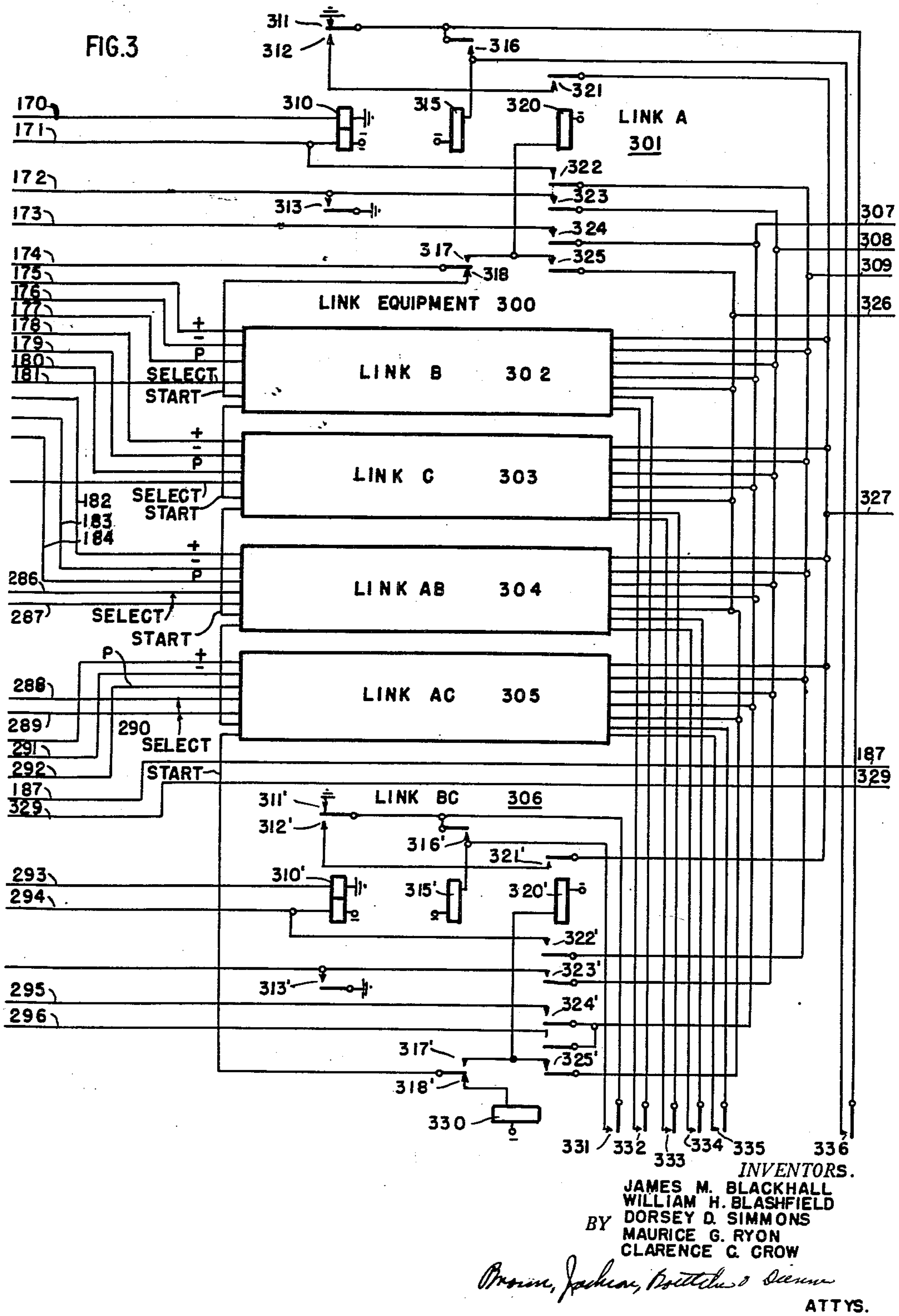
Figure 3 illustrates the link equipment.

It is apparent from the foregoing description that ground is applied to the P-wire of the called party regardless of whether the line is in the idle or busy condition. With reference to Figure 2 and the conductor P–26 as labeled thereat, the seizure of the line circuit equipment for the called party is effected with this application of ground to conductor P–26, such ground effecting operation of line relay 260 of the called party line circuit 200 over a circuit extending from ground at P–26 contacts 256, 224 and 237 to the winding of line relay 260 and battery.

*Called line busy*

If the called line circuit is busy, one or more of the link selection relays A215, B230 and C245 will be in the operated condition and accordingly the operating circuit to the line relay 260 will be interrupted at the contacts of the operated ones of these relays and the application of ground to conductor P–26 will be ineffective to accomplish the seizure of the line circuit 200. In such event as the common control relay 460 restores, it is effective at its contacts 462 to interrupt the holding circuit for the counting chain 500 to effect the restoration of the effective counting relay therein (in this example relay 510); at its contacts 461 reprepares the counting chain for further operation, at its contacts 464 interrupts one of the ground paths which was being extended to conductor P–26 of the called line, and at its contacts 465 extends the ground for the holding circuit of relay 470 over contacts 455 to the busy tone relay 435 to effect the operation thereof (assume Y-wiring).

Relay 435 operates and at its contacts 437 connects busy tone from ground through tone equipment 480 through resistor 493, over contacts 458, 437 to the negative conductor 171 of the calling substation by way of conductor 309, over contacts 322, negative conductor 171, contacts 121, 152, 135, negative conductor 112, over the receiver of the substation set 110 for the subscriber A, positive conductor 111, contacts 117, 133, 150, positive conductor 170, and the upper winding of relay 310 to ground; and at its contacts 438 connects operating ground to the associate slow-to-release relay 460 to effect reoperation thereof.

Relay 460 reoperates, and at its contacts 465 interrupts the energizing circuit for the busy tone relay 435 which after a predetermined period of time restores, and at its contacts 437 interrupts the application of busy tone to the subscriber negative conductor 171, and at its contacts 438 interrupts the energizing circuit for relay 460. Relay 460 after the elapse of a predetermined period of time restores, and once more interrupts the energizing circuit for busy tone relay 435. Relays 435 and 460 continue to interrupt each other to apply busy tone to the calling subscriber line to indicate to the party that the desired called party is inaccessible at this time.

When the calling subscriber restores his handset to his cradle, the operating loop for the link relay 310 is interrupted and the release thereof is effected. Relay 310 in its restoration is operative at its contacts 312 to interrupt the energizing circuit for the common control pulsing relay 415 which restores, in turn opening the circuit of slow to release relay 420. As relay 420 restores, it is effective at its contacts 421 to interrupt the holding circuit for the group selector relay C20 and relay 440 to effect the restoration thereof. Relay 420 at its contacts 425 interrupts the holding circuit for relay 450 which responsively restores, and at its contacts 423 interrupts a holding circuit for the start relay 320 to effect the restoration thereof. Link relay 315 however is held operated over its own contacts 316 and the contacts 311 of the restored relay 310.

Each of the operated relays of the link and common control equipment is now restored and the equipment is ready for use in the establishment of further calls. In the event that the subscriber fails to hang up within a reasonable time (approximately 6 seconds when resistance 401 is connected in circuit with capacitor 413), the timer relay 410 would restore, and at its contacts 411 interrupts the holding circuit for the start relay 320, which in its restoration is effective at its contacts 321 to restore the common control pulsing relay 415. Restoration of the remaining control equipment is effected with the restoration of pulsing relay 415 in the manner just described. In such event the subscriber is still connected to the link equipment 300 over the loop conductors 170 and 171.

*Called line idle*

In the event that the called line is idle as ground is applied to the P-wire P–26 of the called party substation 26, an operating circuit is completed for the line relay 260 of the called party, the incoming ground on conductor P–26 extending over the contacts 256, 224, 237 of the non-operated link selection relays A215, B230 and C245 to the winding of relay 260 and battery.

Relay 260 operates and at its contacts 264 and 266 opens the chain of guard contacts to effect the release of relay 450 in the control equipment 400.

Relay 450 restores, and at its contacts 451 applies the holding ground on contacts 421 to conductor 307 and over contacts 324 to the select lead 173, contacts 261 and the winding of link selection relay 215 to battery to effect the operation thereof; at its contacts 453 completes a secondary holding circuit for the effective counting chain relay which becomes effective as relay 460 in the common control equipment restores, the holding ground now being applied over contacts 453, 442, 461, conductor 433 and contacts 552, 543, 534, 524, 513 to the operated counting chain relay 510 and battery.

Link relay 215 operates, and at its contacts 224 interrupts the energizing circuit for the link relay 260 to effect the restoration thereof, and at its contacts 228 completes a self-holding circuit to the ground on conductor P–26.

As the predetermined period of release of relay 460 expires, relay 460 restores and at its contacts 461 completes the new holding circuit for the effective counting chain relay (in this example relay 510), at its contacts 462 interrupts the previous holding circuit therefor at its contacts 463 completes a point in the chain guard circuit, at its contacts 464 interrupts a point in the seizing ground extended to the desired one of the called party substations (this relay now being held up by the ground applied over contacts 473 of operated relay 470), and at its contacts 465 extends the holding ground for relay 470 over contacts 456 to the center tap on the ringing transformer 405 to effect the energization thereof (assuming Y wiring).

Ringing vibrator 495 which was energized with the seizure of the common control is now rendered effective by reason of the energization of transformer 405. Briefly relay 495 as energized is effective at its contacts 497 to complete an energizing circuit for the ground applied to the primary of the transformer 405 over contacts 498, the arm 499 of the vibrator and resistance 499' to battery, whereupon a ringing voltage is introduced by primary winding 406 into secondary winding 407 of the transformer 405 and extended thereby over conductor 449. With the opening of contacts 497 by the vibrator 495 in its operation, the operating circuit for vibrator 495 is interrupted, and the vibrator arm 499 is released to recomplete an operating circuit for the relay 495 and to complete an operating circuit through the upper half of the primary winding 406 of transformer 405, contacts 496 and resistance 499' to battery.

Relay 495 operates its vibrator 499 between its two positions to alternately energize the upper and lower half of the winding of the transformer 405 and thereby impress alternating current ringing voltage on the ringing conductor 449. With reference to the counting chain arrangement 500, it will be apparent that the contacts 515, 516, 528, 529, etc., thereof are arranged in given combinations to apply ringing voltage to the R conductor of the seized one of the subscriber lines. With reference to this contact arrangement, it is noted that conductor R1 which is connected to contacts 515 is multiplied to the ringing conductor of the first substation of each group of ten stations, and the conductor labeled R6 is multiplied to the ringing conductor associated with the sixth substation of each group of ten stations. With the sequence relays 560 and 570 of the counting chain in the non-operated condition, the upper group of contacts for conductors R1 and R5 will be rendered effective, and with the sequence relays 560 and 570 operated the lower group of contacts for ringing conductors R6 to R0 is rendered effective. Accordingly, in the present example in which the registered second digit is 6, ringing voltage is applied to conductor R6.

Since the selector relay C20 associated with the second group of lines is hold operated at this time, ringing voltage will be applied to conductor R26 associated with the called party, the ringing voltage being specifically applied over conductor 449, contacts 566, 516 and closed contacts 611 to ring conductor R26 (213) (which extends to the substation set 210, see Fig. 2), over the ringer circuit at the substation, back through the negative conductor 212 of the called line, over contacts 235, 252, 221, negative conductor 271, conductor 171, through the lower winding of relay 310 to ground and the power supply. Ring-back tone is supplied by a branch of this circuit through contacts 121, 152, 135, negative conductor 112, the receiver of subscribers set 110, positive conductor 111, contacts 117, 133, 150, positive conductor 170, and the upper winding of relay 310 to ground.

Figure 4:
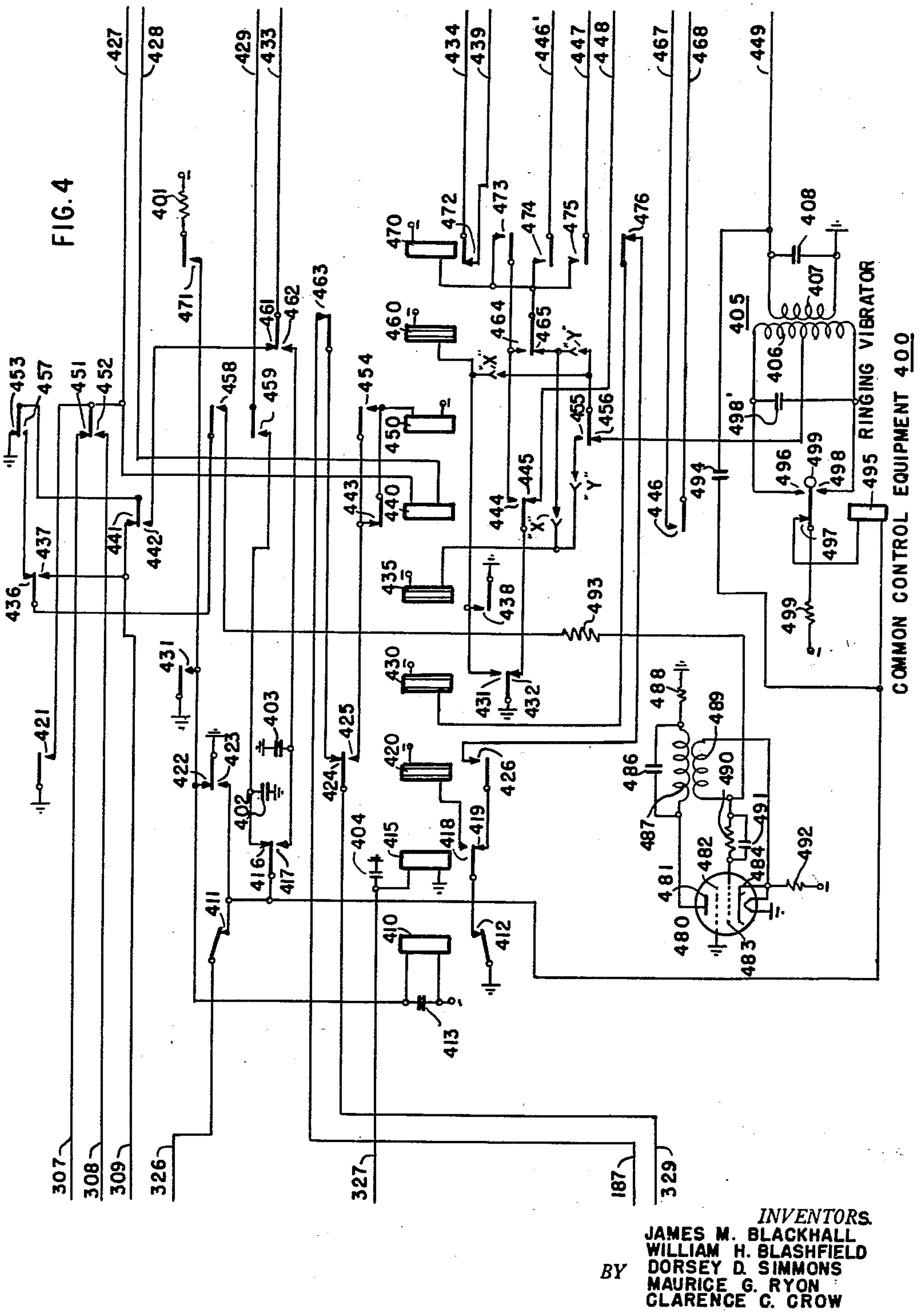
Figure 4 illustrates the common control equipment.

With reference to Figure 4, it is noted that the alternative X and Y wiring arrangements are shown thereat. As will be apparent from the following description, the nature of the ring which is used in signalling the called subscriber is determined by the wiring used, the X wiring resulting in the provision of one long ring, and the Y wiring resulting in the provision of three short rings.

With the connection of the Y wiring, the center tap of the ringing transformer 405 is energized during the entire ringing period by ground which is extended over contacts 432, 444, 473, 465, the Y wiring, and contacts 456 in the manner previously described. With X wiring, the same ground is extended to relay 435 with restoration of relay 460. Relay 435 operates, and at its contacts 438 connects operating ground to its associated slow-to-release relay 460 to effect the reoperation thereof; and at the same time, at its contacts 438, connects ground over the X-wiring and contacts 456 to the center tap of the ringing transformer 405 to energize same.

Relay 460 reoperates, and at its contacts 465, interrupts the energizing circuit for relay 435, which after a predetermined period of time restores; and at its contacts 438 interrupts the energizing circuit for relay 460 and the center tap of ringing transformer 405. Relay 460, after the elapse of a predetermined period of time, restores, and once more energizes relay 435. Relays 435 and 460 continue to interrupt each other to intermittently energize the center tap of the ringing transformer 405 to effectively provide the called party with an intermittent ring during the length of the ringing period.

Only a single ringing period is applied to the called party substation in the system shown herein, to prevent holding of the control equipment by a party for an unreasonable period of time. If the called party answers during the period that ringing current is applied to the ringer of his substation, the ring continues until timed out by timer means in the control system. However, only a slight ringing tone is heard in the receiver of the called party.

Timing of the ring and release of the entire control is governed by the release of the timer relay 410, the release thereof being shorter than the 10 second time period normally effected since resistor 401 is connected in the discharge circuit for capacitor 413 by contacts 471 at this time. Changing of the RC characteristics is effected with operation of relay 470 following temination of dialing by the calling party.

As the timer relay 410 restores after the expiration of a given period of time, it is effective at its contacts 411 to interrupt the holding circuit for the start relay 320, and at its contacts 412 is effective to interrupt the holding circuit for common control relay 420.

Start relay 320 restores, and at its contacts 321 interrupts the holding circuit for the allotter relay 315, which restores, and at its contacts 321 interrupts the energizing circuit for the common control pulsing relay 415. Allotter relay 315 restores and at its contacts 318 transfers the incoming start lead 174 to the next idle link. Relay 415 restores. Inasmuch as timer relay 410 is restored, pulsing relay 415 in its restoration is ineffective at this time to complete an operating circuit for relay 430.

Relay 420 restores, and at its contacts 421 interrupts the holding circuit for the counting chain sequence relays 560 and 570, the selector relay C20 and the series relay 440, at its contacts 422 completes an energizing circuit for the timer relay 410, at its contacts 423 opens the operating circuit for the ringing vibrator 495 and interrupts a further point in the holding circuit for the start relay 320, and at its contacts 424 completes a point in the chain guard circuit. Relay 440 releases and at its contacts 442 restores counting chain relay 510.

Relay 440 restores, and at its contacts 444 interrupts the holding circuit for relay 470 to effect restoration thereof, and removes ground from the ringing transformer 405 to terminate transmission of the ringing signal by the ringing equipment. The common control equipment 400 is now completely released from the link, the ringing signal is terminated, and the common control equipment is in the released condition for use by other subscribers in the establishment of calls over other links which are idle.

The talking path for the subscribers extends from the substation of subscriber A over conductors 111 and 112, contacts 117 and 121, 133 and 135, 150 and 152 and conductors 170 and 171 to substation B over conductors 270 and 271, contacts 217 and 221, 233 and 235 and 250 and 252. Control relay 310 of link A provides talking battery over conductors 170 and 171 to the connection.

*Release*

During conversation the link control relay 310 is maintained operated over the line paths of both the calling and called parties in parallel. When both the calling and called parties restore their receivers, the line loops to the link control relay 310 are interrupted to release same.

Link control relay 310 responsively restores, and at its contacts 313 interrupts the holding ground for the particular link selection relay which is operated in each of the line circuits 100 and 200, the operated link selection relays in the illustrated example being A115 and A215.

*Conference calls*

The telephone system of the invention is also arranged to provide conference calls for predetermined subscribers. In the illustrated arrangement a maximum of any six predetermined stations may be interconnected for conference service. The service is set up by dialing a predetermined conference number, whereupon the six predetermined parties are automatically signalled and connected to a common talking circuit if not busy.

With reference to Figure 5, it is noted that line 20 of the exchange has been assigned for the purpose of conference calls, conference call relay 580 being connected to the connector switch C20 at the point that the P conductor of line 20 would be normally made. The establishment of a conference call is effected in the normal manner. That is, the calling subscriber lifts his receiver and dials the digit 20 to operate the link selection equipment 100, the link equipment 300, and the common control equipment 400 in the manner described to effect seizure of the conference call relay 580. In the establishment of such call the connector relay C20 will be operated responsive to receipt of digit 2 by the common control equipment, and the counting chain relay 550 and sequence relays therein 560 and 570 will be operated responsive to receipt of digit 0. As the common control relay 430 restores a predetermined period of time following cessation of receipt of the impulses representing the last digit 0, it is effective at its contacts 432 to complete an operating circuit for the cut-through relay 470, which operates, and at its contacts 475 extends the seizing ground through to the conference line 20. The ground is specifically extended over contacts 432, 444, 473, 475 conductor 447, contacts 554, 564 and 618*a* to the winding of the conference call relay 580 and battery.

With reference to contacts 581 to 584 of the conference call relay 580, it is noted that the P wires P21 and P36 have for exemplary purposes been connected for control by the conference call relay 580, it being apparent that others of the subscriber line groups could also be connected thereto for conference call purposes. With operation of the conference call relay 580, ground is applied over contacts 581, 582 to cause each of idle ones of the predetermined line circuits to land on the calling link.

Conference call relay 580 at its contacts 583 and 584 applies ringing current to the ring wire of all of the lines in the seized conference group, the ringing of the lines being also effected in the manner heretofore described.

It is noted that if one of the lines in the conference group is busy, one of the link selector relays 215, 230 or 245 for that line will be in the operated condition and accordingly it cannot be connected to the link which is originating the conference call. Ringing tone will however be applied to the substation ringer and the party will be notified that a conference call is being initiated.

It should be observed that no line relays are equipped for line 20.

*Code call*

Paging of a desired subscriber over the code call equipment may be effected by a subscriber by removing his handset, dialing a predetermined preassigned digit (21) to seize the code call equipment, and thereafter dialing the code call directory number of the party to be paged. The called subscriber upon hearing his code call as transmitted over the code call signalling system, responds by lifting the receiver of the nearest substation and dialing a preassigned two digit number (22) to cause the exchange to automatically connect him to the code call equipment and the calling party.

Assuming that the illustrated line circuit 100 is to be used as the line circuit for the code call equipment, the strap shown in dotted lines in Figure 1 is removed, and the positive and negative and P wire conductors 111, 112, and 199 respectively are permanently connected to the calling terminals of the code call equipment. A second line circuit, such as the line circuit associated with line 22, is assigned for code call answering purposes and is permanently connected to the positive, negative and P wire answer terminals of the code call equipment. A similar strap is cut in the line circuit associated with the called leads of the code call. Each of the positive negative and R conductors such as 111, 112 and 113 in the exchange are connected to each subscriber telephone substation in the manner shown.

It is now assumed that subscriber B, having directory number 26, desires to use the code call equipment to page subscriber X having directory number 35. The call is initiated by the calling subscriber B removing his handset in the conventional manner, whereupon an idle one of the links and the common control equipment will be seized as heretofore described. The calling subscriber now dials the predetermined two digit number which has been assigned to the code call equipment (21), and the counting chain equipment in the common control advances in response thereto to operate the group selection relay C–20 and to effect the connection of ground to the test conductor P21 for the line circuit associated with the code call equipment. With the application of ground to conductor P21, the line relay 160 associated with the line circuit 100 for the code call equipment operates over the circuit extending from ground on conductor P21, contacts 156, 124, 137 and the winding of relay 160 to battery.

Line relay 160 operates, and at its contacts 161, 162 and 163 completes an operating circuit (*s*) for the line selection relay or relays associated with the seized one of the links. Assuming that link A has been seized by subscriber B, an operating circuit is completed to the line selection relay A in line circuit 100 with the closure of contacts 161 by the operating line relay 160.

Line selection relay 115 operates, and at its contacts 117, and 121, connects the code call equipment to the seized link A over the positive, negative and test conductors 111, and 112, 119 and contacts 117, and 121, 133, and 135, 150 and 152 and conductors 170, 171. The substation of the calling subscriber B is also connected to the link over conductors 270 and 271 and contacts 217 and 221, 233 and 235, 250 and 252 and conductors 211 and 212.

The common control equipment now restores as heretofore described, leaving the code call equipment connected over line circuit 100 and link A to subscriber B.

Ground is connected by the code call equipment to the test wire 21 in order to hold the line selection relays A115 and A215 during the subsequent pulsing of the link control relay 310, which occurs incidentally as the calling subscriber now dials the third and fourth digits (code call digits) to page the desired party.

As the calling party dials the code call directory number of the desired subscriber (in the assumed example directory number 35, the pulses are extended) over the seized link A and the interconnected positive and negative conductors of the line circuits 100 and 200 to the code call equipment. The code call equipment responds in conventional manner to page the desired party by automatically coding a gong or other signalling device with the code number. The called party upon hearing his code call, responds by lifting the handset of the nearest substation to thus control same to operate its associated line circuit to seize an idle link and the common control equipment.

Assuming the called party answers from his own substation, and that link B and the common control equipment are idle and are seized by such operation, the link selection relay, such as 130, in the line circuit, such as 100, which is associated with his substation operates to connect same to the common control equipment. On receipt of dial tone from the common control equipment over the loop thus completed, the called party dials the preassigned code call answer digit 22 to seize the code call answer link in a manner obvious from the previous description.

Responsive to the selection of the answer line circuit 22 and the application of ground on the test conductor P22 by the common control equipment, an operating circuit is extended over test conductor P22 to equipment in the code call arrangement to terminate transmission of the code.

The ground on test conductor P22 simultaneously effects operation of the line relay, such as 160, associated with the line circuit for line 22, which in turn completes an operating circuit for the selection relay B130 associated with the seized link B. Link selection relay B130 operates, at its contacts 132, 136 and extends the code call answer conductors positive, negative and test to the line circuit of subscriber 35.

The calling and called parties may now conduct a conversation over the completed connection.

Release of the equipment is effected with restoration of the receivers by the called and calling parties in a manner which is obvious from the previous description.

These and various other features of the disclosed apparatus are believed to constitute a new and desirable advancement in the art, these features and others being now set forth in the accompanying drawings.

What is claimed is:

1. In an automatic telephone system, a plurality of subscriber lines, a plurality of single-ended link circuits for connecting calling ones and called ones of said lines, a line circuit for each line including link selection equipment and a line relay operated responsive to initiation of a call over its associated line for enabling its associated link selection equipment to connect the calling line to an idle one of said links, selector means accessible to said links controlled by the calling subscriber over said seized link equipment for selecting the line circuit associated with a desired one of the other subscribers, and switching means controlled responsive to selection of the line circuit for the called line to energize said link selection equipment for said called line to connect the called line to the calling line and seized link.

2. In an automatic telephone system, a plurality of subscriber lines, at least one single-ended link circuit, link selection equipment for each line, line control means operated responsive to initiation of a call over its associated line to control the associated link selection equipment to connect the calling line to said link as idle, selector means controlled by the calling subscriber over said seized link equipment to select and signal a desired one of the other subscribers, and switching means operated responsive to termination of selection control by the calling subscriber to energize said called line link selection equipment to connect the called line as idle to said seized link and said calling line.

3. In an automatic telephone system, a plurality of subscriber lines, a plurality of single-ended link circuits for connecting calling ones and called ones of said lines, a line circuit for each line including link selection equipment and a line relay operated responsive to initiation of a call over its associated line for enabling said link selection equipment to connect the calling line to an idle one of said links, selector means controlled by the calling subscriber over said seized link equipment for selecting the line circuit equipment of a desired one of the other subscribers lines, switching means operated responsive to completion of the control operation by the calling subscribers in the selection of the called line to control connection of the called line to said seized link prior to signalling of the called line.

4. An automatic telephone system according to claim 3 in which each of said link circuits includes a single battery feed relay for supplying talking battery to both the calling and called lines, and means for connecting said battery feed relay to each subscriber connection established over its associated link.

5. In an automatic telephone exchange, a plurality of subscriber lines, at least one single-ended link circuit for connecting calling ones and called ones of said lines, a line circuit for each line including link selection equipment comprising a group of link selecting relays less in number than the number of links in said exchange, and line relay means operated responsive to initiation of a call over its associated line to seize an idle link and to control operation of one or more of said link selecting relays to connect the calling line to said seized link, selector means accessible to said links controlled by the calling subscriber over said seized link equipment for selecting the line circuit equipment of a desired one of the other exchange subscribers, and switching means in said selector means for controlling energization of the line circuit equipment for said called line which corresponds to the energized equipment of the line circuit for said calling line to thereby connect said called line to said calling line and said seized link.

6. In an automatic telephone exchange a plurality of subscriber lines, at least one link circuit for connecting calling ones and called ones of said lines, a line circuit for each line including link selection equipment comprising a group of link selecting relays, circuit means for preassigning said link selecting relays singly and in given combinations to given ones of said links, and line control means operated responsive to initiation of a call over its associated line to seize an idle link and control operation therewith of the predetermined link selection relay equipment associated with the seized one of said links to connect the calling line to said idle link, selector means accessible to said links and controlled by the calling subscriber over said seized link equipment for selecting the line circuit of a desired one of said subscribers and controlling same to effect connection of said called line to said seized link and said calling line.

7. In an automatic telephone system, a plurality of subscriber lines, a set of six single-ended link circuits for connecting calling ones and called ones of said lines, a line circuit for each line including link selection equipment comprising only three link selecting relays and a line relay operated responsive to initiation of a call over its associated line to seize an idle one of said links and control therewith the enablement of a predetermined one or more of said link selecting relays to connect the calling line to the seized one of said links, said link selection relays being controlled to operate singly or in combination in accordance with the particular link which is seized, selector means accessible to and controlled by the calling subscriber over said seized link equipment for selecting the line circuit of a desired one of the other subscribers lines, and switching means in said selector means operated responsive to termination of selection control by the calling party to energize said line circuit equipment associated with the called line to control same to connect said called line to said calling line and said seized link.

8. In an automatic telephone system, a plurality of subscriber lines, a plurality of single-ended link circuits for connecting calling ones and called ones of said lines, a line circuit for each line comprising link selection equipment including a group of link selecting relays and a line relay, a guard circuit connected in series for control by each line relay in said system, means associated with each line circuit for operating its line relay responsive to initiation of a call over its associated line, means operated by said line relay to seize an idle one of said links and to operate therewith predetermined ones of said links selecting relays, means controlled with operation of said predetermined link selector relays to connect the calling line to the seized one of said links and to render said guard circuit effective to prevent seizure of the link equipment by other subscribers at this time, selector means accessible to and controlled by the calling subscriber over said seized link equipment for selecting the line circuit of a desired one of the other subscribers, switching means in said selector means operated responsive to termination of the selection control operation by the calling subscriber to energize the corresponding equipment associated with the called line to connect same to said calling line and seized link, and guard circuit restoring means controlled by said line circuit relays operative with energization thereof following line selection to restore the associated line relay and said guard circuit.

9. In an automatic telephone system, a plurality of subscriber lines, a substation for each subscriber line, a plurality of single-ended link circuits for connecting calling ones and called ones of said lines, a line circuit for each line including a test conductor, link selection equipment including means for marking said test conductor idle and busy, and a line relay operated responsive to initiation of a call over its associated line to seize an idle link and operate therewith predetermined ones of said link selection equipment to connect the calling line to the seized one of said links, selector means accessible to said links and connected for control by the calling subscriber over said seized link equipment to select the line circuit of a desired one of the other subscribers lines, and switching means in said selector means operated with selection of the called line circuit to test the test wire of the line circuit associated with the called line for a busy condition, and means including said line circuit equipment for said called line controlled by said switching means to connect same to said calling line and seized link if an idle condition is indicated.

10. In an automatic telephone system, a plurality of subscriber lines, a plurality of single-ended link circuits for connecting calling ones and called ones of said lines, a line circuit for each line including a test conductor, link selection equipment, means controlled by said link selection equipment for marking said test conductor busy and idle, a line relay operated responsive to initiation of a call over its associated line to seize an idle link and control therewith operation of said link selection equipment to connect the calling line to the seized one of said links, selector means controlled by the calling subscriber over said seized link equipment for selecting the line circuit of a desired one of the other subscribers lines, switching means operatively controlled by said selector means immediately following selection of the called line to test the test wire of the line circuit associated with the called line for a busy condition, and means including said link selection equipment and said switching means operative to connect the called line to said calling line and seized link, if an idle condition is indicated.

11. In an automatic telephone system, a plurality of subscriber lines, a plurality of single-ended link circuits for connecting calling ones and called ones of said line a circuit for each line comprising, link selection equipment including a group of link selecting relays and a line relay operative with initiation of a call by its associated subscriber, a guard circuit operated responsive to operation of a line relay to temporarily prevent operation of the other line relays in the system means simultaneously operated by said line relay to seize an idle link and being operative therewith to enable said link selection equipment to connect the calling line to the seized one of said links, and common control means including selector means accessible to said links and controlled by the calling subscriber over said seized link equipment for selecting and the line circuit of a desired one of the other subscribers lines, circuit control means for maintaining said guard means effective during the seizure of said common control means by a subscriber, and switching means operated immediately following selection of the line circuit of the called line to energize the corresponding line circuit equipment associated with the called line to effect connection of the called line to said calling line and seized link, and means operative to simultaneously release said guard circuit to permit use of the idle links in the system by other subscribers.

12. A telephone system as set forth in claim 11, which includes control means operative to provide waiting subscribers access to said common control means, as released, in a predetermined order of preference.

13. In an automatic telephone system, a plurality of subscriber lines, a plurality of single-ended link circuits for connecting calling ones and called ones of said lines, allotter means for preallotting said links for use in a predetermined manner each of said links including an allotter relay, a start relay and a control relay; a line circuit for each line comprising link selection equipment including link selection relays, and line relay means operated responsive to initiation of a call over its associated line for enabling the start relay of an idle one of said links as preallotted by said allotter means and for simultaneously preparing its associated link selection relays for operation, circuit means controlled by said start relay in its operation to complete operating circuits for the preassigned one or ones of said link selection relays, means controlled by operated ones of said link selection relays to connect said calling line to the seized one of said links means for connecting said link control relay for control by the calling subscriber, selector means accessible to said control relay and operatively controlled thereby responsive to receipt of the impulses transmitted by the calling subscriber for the purpose of selecting and signalling a desired one of the subscribers lines, and switch means operated responsive to termination of receipt of the selecting impulses from the calling subscriber to energize the corresponding link selection equipment associated with the called line to connect same to said calling line and said seized link.

14. In an automatic telephone system, a plurality of subscriber lines, a plurality of single-ended link circuits for connecting calling ones and called ones of said lines, a line circuit for each line comprising link selection equipment including link selection relays and line relay means operated responsive to initiation of a call over its associated line, a start relay in each of said links, a start conductor connected between each of said links and each of said line circuits, allotter relay means in each of said links connected to preallot an idle link for selection over its start circuit by the line circuit of the succeeding calling subscriber, means for connecting the start relay of the preallotted link to said start conductor and means controlled by said start relay and the line relay of the calling party line circuit as operated to complete operating circuits for a preassigned one or ones of said link selection relays thereat; means operative to connect the calling line to the seized one of said links, responsive to operation of said link selections relays, selector means controlled by the calling subscriber over said seized link equipment for selecting and signalling a desired one of the other subscribers, and switching means in said selector means operated responsive to selection of the called line thereby to energize said corresponding link selection equipment associated with the called line to connect same to said calling line and said seized link.

15. In an automatic telephone system, a plurality of subscriber lines, each of said lines having impulse transmitting means individual thereto, a plurality of single-ended link circuits for connecting calling ones and called one of said lines, allotting means for preallotting an idle link for use by the calling line, a line circuit for each line comprising link selection equipment including link selection relays and a line relay operated responsive to initiation of a call over its associated line for seizing the preallotted idle link, common control means accessible to said link including selector means operative responsive to receipt of impulses transmitted by the calling subscriber over the seized link to select the line circuit equipment of a desired one of the subscriber lines, a start relay in each link operative responsive to seizure of its associated link to prepare operating circuits for a preassigned one or ones of said link selection relays, and to simultaneously seize said common control means circuit means controlled by said common control equipment and link equipment in combination to operate the predetermined ones of said link selection relays, connecting means associated with said link selection means responsively operated therewith to connect the calling line to the seized one of said links, a control relay in each link for retransmitting to the common control equipment the impulses transmitted by the calling subscriber, and switching means in said common control means operated responsive to selection of the called line to energize the corresponding link selection equipment associated with the called line to connect same to said calling line and said seized link.

16. An automatic telephone arrangement as set forth in claim 15 in which said common control equipment includes relay means effecting automatic restoration of said common control equipment with connection of said called line to said link, whereby the completed connection includes the seized link, and the line circuits and substations of the called and calling parties, and in which talking battery is supplied to the connection by said link control relay.

17. In an automatic telephone system, a plurality of subscriber lines, a plurality of single-ended link circuits for connecting calling ones and called ones of said lines, a line circuit for each of said line comprising link selection equipment including a line relay operative responsive to initiation of a call over its associated line to seize an idle link and control operation therewith of said link selection equipment to connect the calling line to the seized one of said links and control means, to each of said links and connected for control by each link as the link is seized, said common control means including selector means controlled by the calling subscriber over said seized link equipment for selecting the line circuit of a desired one of the other subscribers line, and time switch means in said common control equipment operative to energize said link selection equipment associated with the called line to connect same to said calling line and seized link independent of said common control equipment, and means in said common control equipment operative to restore the common control equipment a predetermined period after the completion of each connection without disturbing the completed subscriber connection.

18. In an automatic telephone system, a plurality of subscriber lines, a plurality of single-ended link circuits for connecting calling ones and called ones of said lines, a line circuit for each line including link selection equipment and a line relay operated responsive to initiation of a call over its associated line to seize an idle link and to control therewith said link selection equipment to connect the calling line to an idle one of said links, and common control equipment accessible to each of said links including selector means controlled by the calling subscriber over said seized link equipment to select a desired subscriber line, switching means operated with selection of the called line to energize the corresponding link selection equipment associated with the called line to connect same to said calling line and seized link, and ringing equipment for thereafter applying ringing current to the connection thus established.

19. An automatic telephone system as set forth in claim 18, in which said common control equipment includes ringing means operative to apply only a single ring to the connection and release means for thereafter releasing said common control equipment from said connection.

20. An automatic telephone system as set forth in claim 18, in which said common control means includes ringing means operative to apply ringing signals intermittently, and timing means for releasing said common control equipment after a predetermined period of ringing.

21. In an automatic telephone system, a plurality of subscriber lines, arranged in groups, each of which lines includes impulse transmitting means individual thereto a plurality of single-ended link circuits for connecting calling ones and called ones of said lines, a line circuit for each line including link selection equipment and a line relay operated responsive to initiation of a call over its associated line to seize an idle link and operate therewith said link selection equipment to connect the calling line to an idle one of said links; and common control equipment accessible to each of said links including a counting chain operative responsive to receipt of impulses over said seized link equipment as transmitted by the calling subscriber, a plurality of group selection relays in said common control equipment accessible to said counting chain means for selecting the line circuit equipment of a desired one of the other subscribers line groups, means associated with the counting chain means for selecting a predetermined line of the selected group in accordance with the nature of the impulses transmitted by the calling subscriber, and switching means in said common control equipment operated responsive to termination of transmission of the selective impulses by the calling subscriber to energize said link selection equipment associated with the called line to connect same to said calling line and seized link and means for restoring said common control equipment a predetermined time after completion of the connection without disturbing said connection.

22. In an automatic telephone system, a plurality of subscriber lines, each of said lines having impulse transmitting means individual thereto a plurality of single-ended link circuits for connecting calling ones and called ones of said lines, a line circuit for each line comprising link selection equipment and a line relay operated responsive to initiation of a call over its associated line to seize an idle one of said links and to operate said link selection equipment to connect the calling line to the seized one of said links; and common control equipment accessible to each of said links including a relay counting and registering chain for counting the impulses of each digit transmitted by the calling party over said seized link equipment, a plurality of group selection relays accessible to said impulse chain for selecting a desired one of the other subscribers line circuits for signalling purposes, chain cooperating means operative to select the proper group selection relay in accordance with the value of the first digit registered on said chain and to select the proper line of the selected group in accordance with the value of the second digit registered on said chain, and switching means operated responsive to termination of the incoming selecting impulses from said calling subscriber to effect selection of the line circuit of the desired party to energize said corresponding link selection equipment associated with the called line to connect same to said calling line and seized link.

23. An automatic system as set forth in claim 22 which includes impulse cancellation means operative to absorb single impulses received as the first digit to prevent improper operation of the chain by transient pulses.

24. In an automatic telephone system, a plurality of subscriber lines, each of which includes individual impulse transmitting means a plurality of single-ended link circuits for connecting calling ones and called ones of said lines, a line circuit for each line including link selection equipment for each line, line relay means operated responsive to initiation of a call over its associated line operative to seize an idle one of said links and control therewith said link selection equipment to connect the calling line to the seized one of said links; and common control equipment accessible to each of said link as seized including counting chain means operatively responsive to impulses transmitted by the calling subscriber over said seized link equipment thereto, a plurality of group selection relays accessible to said counting means for selecting the line circuit of a desired one of the other subscribers lines, contact means on each of said group selection relays operatively controlled thereby, a pair of conductors extending from each subscriber substation in the exchange to the contacts of said group selection relays, one of said conductors comprising a test lead extending to the line circuit of its associated line and the other of said conductors comprising a ring lead extending directly to the substation equipment for the associated line, means operative to test the test conductor of a called line for an idle and busy condition as selected by the group selection means, switching means operated responsive to selection of the called line to energize said link selection equipment associated with the called line over said test lead therefor to connect said called line to said calling line and the seized link, and ringing control means for thereafter connecting ringing current to the ring conductor of the called line.

25. An automatic telephone arrangement as set forth in claim 22 in which said chain cooperating means includes ringing circuit preparing means for preparing the ringing circuit to the called line with the selection thereof.

26. In an automatic telephone system, a plurality of subscriber lines, each of said lines having an impulse transmitting device individual thereto a plurality of single-ended link circuits for connecting calling ones and called ones of said lines, link selection equipment for each line, line control means operated responsive to initiation of a call over its associated line for enabling said link selection equipment to connect the calling line to an idle one of said links, and common control means accessible to said links as seized including dial tone means for transmitting dial tone to the calling party with seizure thereof, ringing circuit generating means energized with seizure of said common control equipment, counting chain means for registering the impulses transmitted by the calling subscriber, group selection relays controlled by said counting means to select a desired group of said subscriber lines, means controlled by said counting means to select a desired line of said selected group, switching means operated responsive to termination of the incoming impulses transmitted by the calling subscriber and selection of the called line to energize said link selection equipment associated with the called line to connect same to said calling line and seized link, ringing control means for applying said ringing current to said called line thereafter, and restoring means for then restoring said common control equipment without disturbing said connection established thereby.

27. In an automatic telephone system, a plurality of subscriber lines, each of which lines includes an impulse transmitting device individual thereto a plurality of single-ended link circuits for connecting calling ones and called ones of said lines, link selection equipment for each line, line control means operated responsive to initiation of a call over its associated line for enabling said link selection equipment to connect the calling line to an idle one of said links, common control equipment accessible to said links as seized including selector means controlled by the calling subscriber over said seized link equipment for selecting and signalling a desired one of the other subscribers lines, time disconnect means for releasing said common equipment from said calling line a predetermined period after seizure in the absence of incoming impulses, and time switch means operated a predetermined time after selection of the called line to energize said link selection equipment associated with the called line to connect same to said calling line and seized link.

28. In an automatic telephone system, a plurality of subscriber lines, each of which includes an impulse transmitting device individual thereto a plurality of single-ended link circuits for connecting calling ones and called ones of said lines, link selection equipment for each line, line control means operated responsive to initiation of a call over its associated line for enabling said link selection equipment to connect the calling line to an idle one of said links, common control equipment accessible to said links including selector means controlled by the calling subscriber over said seized link equipment for selecting and signalling a desired one of the other subscribers lines, time measuring means for releasing said common equipment from said calling line with lapse of a predetermined period following seizure of said common control equipment without dialling and responsive to elapse of a predetermined time period between successive digits, switching means operated following selection of the called line to energize said link selection equipment associated with the called line to connect same to said calling line and seized link, and ring control means operative thereafter to apply ringing current to said connection for a time period determined by said time measuring means.

29. An automatic telephone system as set forth in claim 28 in which said time disconnect means includes means for rendering same operative to measure a first period of time prior to effecting release of said common control equipment and a second period of time prior to terminating said ringing operation.

30. An automatic telephone arrangement as set forth in claim 28 in which said time disconnect means comprises a relay, a capacitor, and a discharging circuit for said capacitor including said relay.

31. In an automatic telephone system, a plurality of subscriber lines, a plurality of single-ended link circuits for connecting calling ones and called ones of said lines, link selection equipment for each line, line control means operated responsive to initiation of a call over its associated line for enabling said link selection equipment to connect the calling line to an idle one of said links, selector means controlled by the calling subscriber over said seized link equipment for selecting and signalling a desired one of the other subscribers, time switch means operated following selection of the called line to energize said link selection equipment associated with the called line to connect same to said calling line and seized link means for thereafter applying ringing current to the called line, and conference equipment accessible to said subscribers for simultaneously completing a common communication circuit for a plurality of two or more predetermined subscribers said conference equipment comprising a conference initiating means operated with seizure of the conference line, and means controlled by said conference initiating means to connect the predetermined subscriber lines to said conference line, and to apply ringing current to said predetermined subscriber lines.

32. An automatic telephone system as set forth in claim 31 in which said selector means and time switch means are common to all links, and which includes means for automatically restoring said common equipment subsequent to connection of the parties to the conference line without disturbing said conference connections.

References Cited in the file of this patent

UNITED STATES PATENTS

| | | |
|---|---|---|
| 1,626,034 | Gardner | Apr. 26, 1927 |
| 1,944,693 | Oliver | Jan. 23, 1934 |
| 2,292,183 | Wallace | Aug. 4, 1942 |
| 2,486,231 | Voss | Oct. 24, 1949 |
| 2,542,954 | Yates | Feb. 20, 1951 |
| 2,552,799 | Lomax | May 15, 1951 |
| 2,617,888 | Shepherd | Nov. 11, 1952 |
| 2,621,257 | Voss et al. | Dec. 9, 1952 |